United States Patent
Yap et al.

(10) Patent No.: US 9,835,724 B2
(45) Date of Patent: Dec. 5, 2017

(54) SYSTEM AND METHOD FOR SUMMING OUTPUTS IN A LATERAL EFFECT POSITION SENSING DETECTOR ARRAY

(71) Applicant: The Boeing Company, Chicago, IL (US)

(72) Inventors: Daniel Yap, Newbury Park, CA (US); Randall White, Los Angeles, CA (US); Daniel S. Matic, Newbury Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 563 days.

(21) Appl. No.: 14/460,643

(22) Filed: Aug. 15, 2014

(65) Prior Publication Data

US 2016/0047911 A1  Feb. 18, 2016

(51) Int. Cl.
- *G01S 17/06* (2006.01)
- *G01S 7/481* (2006.01)
- *G01S 3/781* (2006.01)
- *G01S 3/784* (2006.01)

(52) U.S. Cl.
CPC .............. *G01S 17/06* (2013.01); *G01S 3/781* (2013.01); *G01S 3/784* (2013.01); *G01S 7/4816* (2013.01)

(58) Field of Classification Search
CPC ........ G01S 17/06; G01S 3/784; G01S 17/003; G01S 17/88; G01S 7/4816; G01C 17/34; G01C 3/00; F41G 7/2293

USPC .................................. 250/221, 214 R, 214.1
See application file for complete search history.

(56) References Cited

U.S. PATENT DOCUMENTS

| | | | |
|---|---|---|---|
| 4,571,712 A | | 2/1986 | Romano et al. |
| 4,703,168 A | * | 10/1987 | Olson .................... H01J 43/246 250/207 |
| 5,448,054 A | * | 9/1995 | Massey .................. G01C 3/085 250/206.1 |
| 6,784,408 B1 | | 8/2004 | Cheung et al. |
| 9,103,914 B2 | * | 8/2015 | Yap .......................... G01S 17/42 |
| 2010/0108859 A1 | | 5/2010 | Andressen |

OTHER PUBLICATIONS

Extended European Search Report for EP 15167211.0, dated Dec. 4, 2015.
Wolfshagen et al., "HgCdTe Position Sensitive Detector (PSD) Development," Proc. of SPIE vol. 7660, 2010, 9 pages.

* cited by examiner

*Primary Examiner* — Que T Le
(74) *Attorney, Agent, or Firm* — Patterson + Sheridan, LLP

(57) ABSTRACT

A system and method includes an array position sensing detector. The array position sensing detector includes a lateral effect position sensing detector element and a summing amplifier. The lateral effect position sensing detector element produces an output coupled with the summing amplifier through a switch.

18 Claims, 16 Drawing Sheets

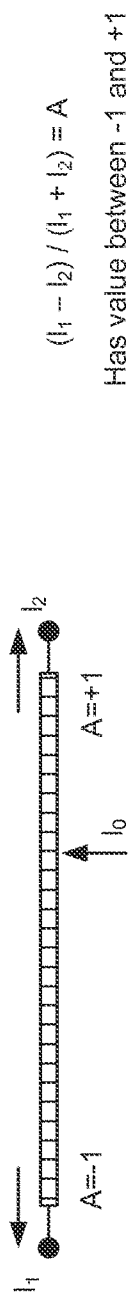

$A = -1$   $A = +1$ $(I_1 - I_2) / (I_1 + I_2) = A$

Has value between $-1$ and $+1$

Single PSD element:

$O_{o1} = G_{PSD} (I_1 - I_2) / (I_1 + I_2) = G_{PSD} A$   $O_{o3L} = G_{PSD} [A + (-2)]$

Row/column of 3 PSD elements:

Left: $O_{o3L} = G_{PSD} [A + (-2)]$

Center: $O_{o3C} = G_{PSD} [A + 0]$

Right: $O_{o3R} = G_{PSD} [A + 2]$

Row/column of 5 PSD elements:

Left, left: $O_{o5LL} = G_{PSD} [A + (-4)]$

Left: $O_{o5L} = G_{PSD} [A + (-2)]$

Center: $O_{o5C} = G_{PSD} [A + 0]$

Right: $O_{o5R} = G_{PSD} [A + 2]$

Right, right: $O_{o5RR} = G_{PSD} [A + 4]$

Row/column of N PSD elements:

Leftmost: $O_{oNL1} = G_{PSD} [A + (-N+1)]$ $2^{nd}$ Left: $O_{oNL2} = G_{PSD} [A + (-N+3)]$ Center: $O_{oNC} = G_{PSD} [A + 0]$ $2^{nd}$ Right: $O_{oNR2} = G_{PSD} [A + N-3]$ Rightmost: $O_{oNR1} = G_{PSD} [A + N-1]$ $o = X$ or $Y$

Figure 8

SYSTEM AND METHOD FOR SUMMING OUTPUTS IN A LATERAL EFFECT POSITION SENSING DETECTOR ARRAY

FIELD

The systems and methods relate to an array lateral effect position sensing detector.

BACKGROUND

Angle of arrival (AOA) sensors generally include an aperture that collects incident light, such as the light from a laser designator or laser illuminator that is back scattered from an object. The aperture projects an illuminated spot onto a 4-quadrant detector. The size of the illuminated spot is slightly larger than the size of one quadrant of the detector, so that at least two quadrants are illuminated. Each detector quadrant produces an output current. The values of the four output currents are then processed to determine the location of the center or the centroid of the illuminated spot and thus the angle of arrival of the incident light relative to the common axis of the aperture and detector.

SUMMARY

According to one aspect, systems and methods can provide for locating a position of a spot of light illuminating an area. The area can be divided into multiple smaller regions and sensed by lateral effect position sensing detectors of the multiple smaller regions. An output can be selected from the lateral effect position sensing detectors with a set of switches connected with the lateral effect position sensing detectors.

Another aspect includes a system and method for an array position sensing detector. The array position sensing detector includes a lateral effect position sensing detector element and a summing amplifier. The lateral effect position sensing detector element produces an output coupled with the summing amplifier through a switch. Many other embodiments are possible, and the embodiments should not be limited by the summary.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element.

FIG. 8 shows several illustrative examples of how the LEPSD identifying offset value is determined.

DETAILED DESCRIPTION

Systems and methods provide for an electronic signal-combination module for an array lateral-effect position sensing detector (ALEPSD). The system and methods can enable an array of multiple smaller-area lateral-effect position sensing detector (LEPSD) elements to provide the position-determination capability of a large-area LEPSD, and the wide angular field of view achieved by an angle-of-arrival sensor can include a large detector area. The system and methods can also provide the high speed and large frequency bandwidth response of the smaller-area LEPSD element. The system and methods include electronic circuits that combine position-location output waveforms, with an output given for each of two orthogonal axes, from the multiple LEPSD elements of an array to produce two new output waveforms that represent the location, also along each of two orthogonal axes, of one or more spots of light illuminating portions of the large-area array. The spot-location signals from those LEPSD elements that are illuminated by the incident light are coupled, through a set of switches, to a combiner circuit or module. There is a switch set for each LEPSD element of the array.

Figure 1:
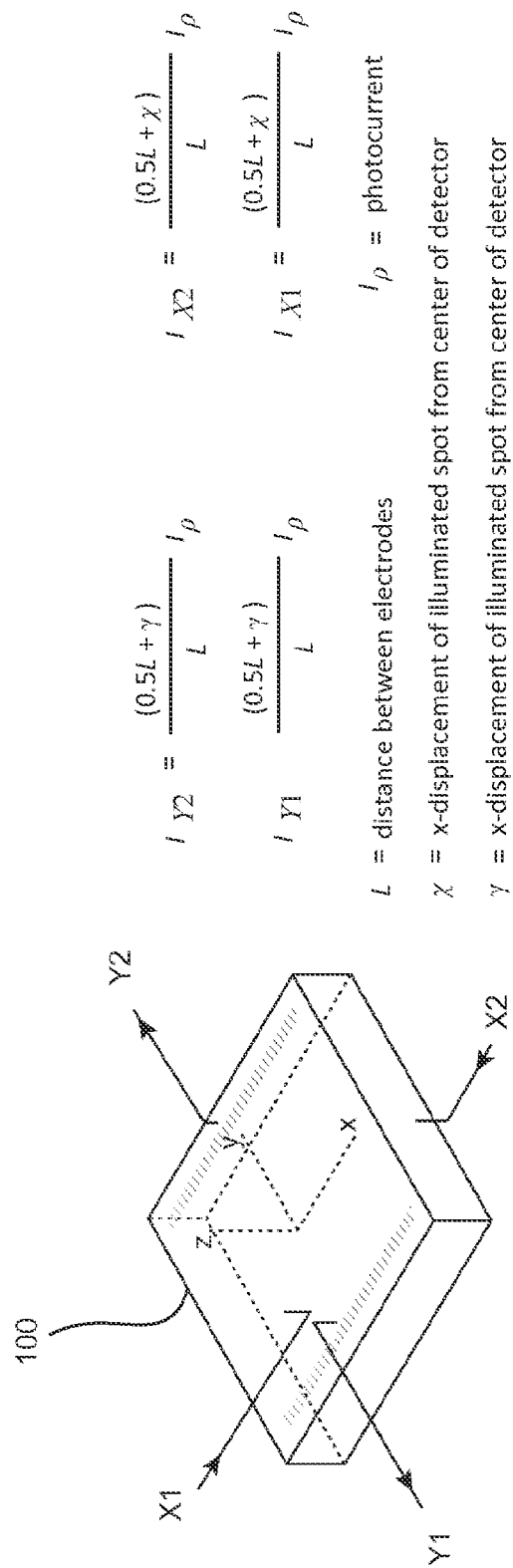
FIG. 1 is a block diagram of an exemplary dual-axis lateral effect position sensing detector (LEPSD).

FIG. 1 is a block diagram of an exemplary dual-axis lateral effect position sensing detector (LEPSD) 100. The LEPSD 100 can sense the position of a small focused or nearly focused spot of light. With a LEPSD, the maximum allowable excursion of the spot of light, and thus the maximum angular deviation detected by an angle of arrival sensor, can be limited by the size of the light-detecting area. The LEPSD 100 can determine the location of the incident spot of light along the x-axis and the y-axis, whose origin is located at the center of the light-detecting area of that device. In one example, the LEPSD 100 has four electrodes that are located at the four edges of the square device. A set of two electrodes are located near the top of the device and another set of two electrodes are located near the bottom of the device. Those two sets are arranged perpendicular to each other. One set of electrodes is used to determine the x-location and the other set used to determine the y-location of the spot of light.

The dual-axis LEPSD 100 has a light absorbing and photo-current generating layer that is located between two laterally resistive layers. The relative location of the incident spot of light with respect to the two electrodes of a set will determine the relative amounts of the two currents that are output from those two electrodes. Essentially the photo-current is conducted through a resistive divider whose resistance values depend on the location of the illuminating spot relative to the two electrodes of a set. If the illuminated spot is located at the center of the device, the two current outputs from the electrodes are equal. The result of subtracting those two currents is zero. If the illuminated spot is located very close to one electrode, the current output from that electrode is much larger than the current output from the opposite electrode.

Considering, for example, two electrodes that are placed along the y-axis, if the spot of light is near the electrode located at a positive y-value (i.e., electrode Y2), the current $I_{y2}$ will be much larger than the current $I_{y1}$. The difference $(I_{y2}-I_{y1})$ will be positive. In order to make the y-position determination insensitive to the actual intensity of the light and to the overall photo-current, $I_p$, the difference current is divided by the sum of the two currents (e.g., $(I_{y2}-I_{y1})/(I_{y2}+I_{y1})$). Similarly, the x-position determination is given by two output currents from the X1 and X2 electrodes. The x-position is determined from the analog operation $(I_{x2}-I_{x1})/(I_{x2}+I_{x1})$. The two-axis LEPSD 100 fabricated with silicon detector material as well as their signal processing circuitry is available from various commercial suppliers such as Thorlabs, OSI Optoelectronics, Pacific Silicon Sensor, Inc., and On-Trak Photonics, Inc.

Figure 2:
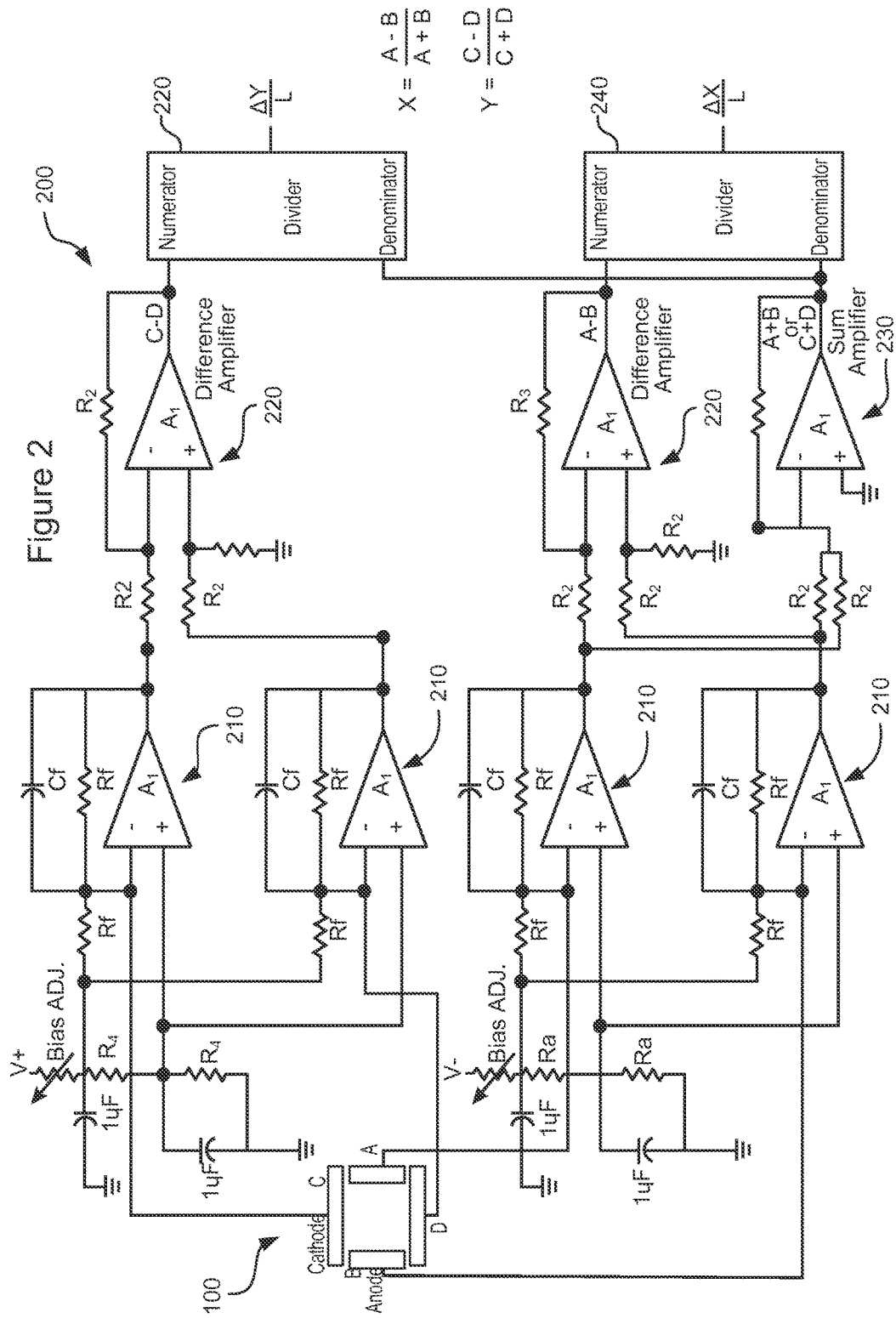
FIG. 2 is a circuit diagram of exemplary electronic circuit including preamplifiers and position determination for LEPSD.

FIG. 2 is a circuit diagram of exemplary electronic circuit 200 including preamplifiers and position determination for LEPSD 100. The circuit 200 includes the LEPSD 100 connected with electronic transimpedance preamplifier circuits 210, analog difference circuits 220, sum circuit 230 and divider circuits 240, e.g., as manufactured by OSI Optoelectronics. These analog difference, sum and divider circuits comprise the position determination circuit (PDC) of the LEPSD 100. Although a single LEPSD 100 can locate the spot of light illuminating a portion of the area of that LEPSD, and thus determine the angle of arrival of the incident light, with high resolution, the overall field of view for that angle-of-arrival sensor can be limited by the relatively small area of the single LEPSD 100. Enlarging the size of the LEPSD 100 can cause its capacitance to increase and thus reduce its frequency response and increase its noise.

Figure 3:
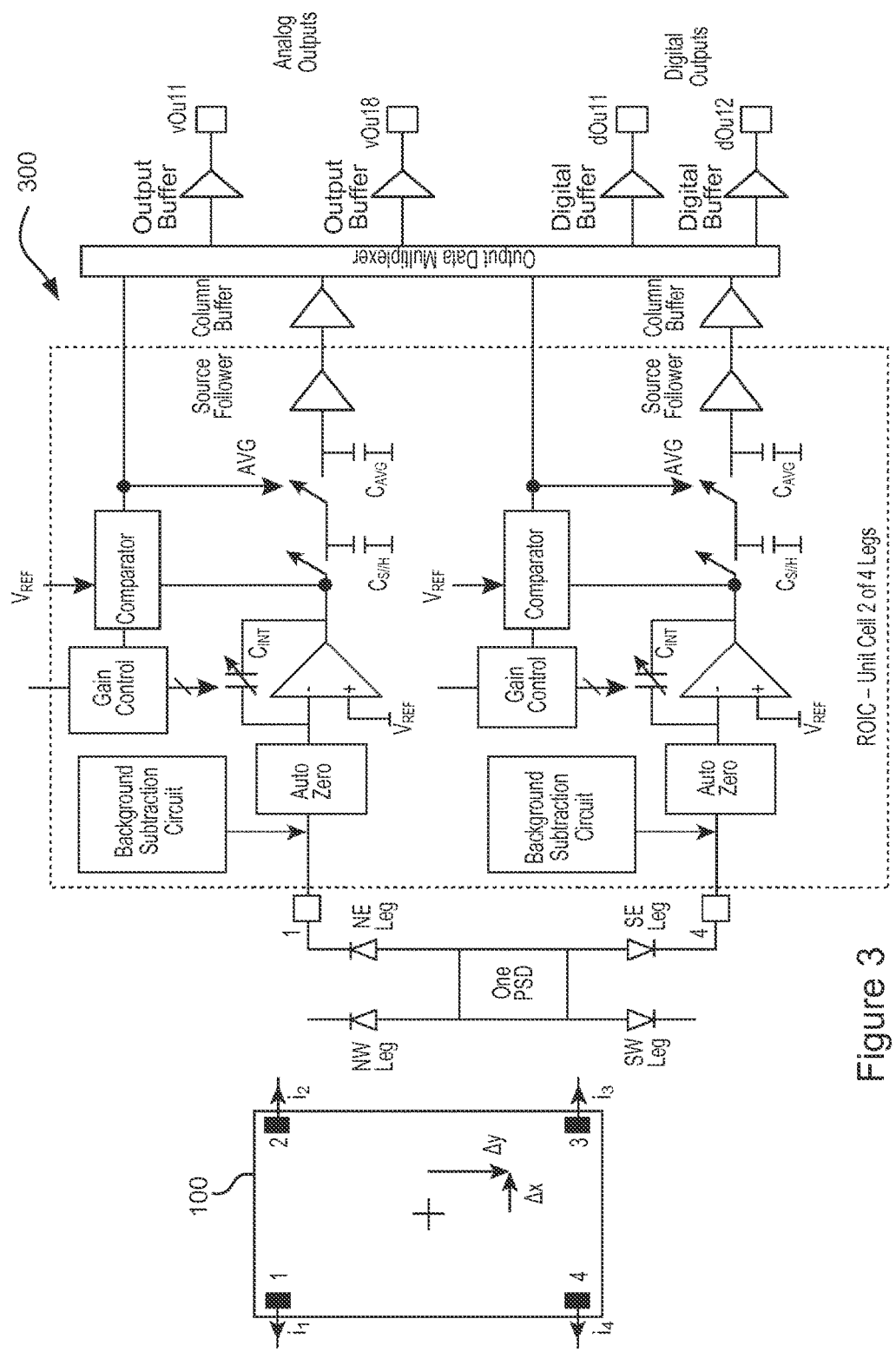
FIG. 3 is a circuit diagram of an exemplary array of LEPSD elements whose outputs are provided on a frame-by-frame basis.

FIG. 3 is a circuit diagram 300 of an exemplary array of LEPSD elements whose outputs are provided on a frame-by-frame basis. One way to increase the overall light detecting area is to use an array of LEPSD elements. For a two-dimensional array, each LEPSD 100 is a quadrilateral device that has one lateral current conducting layer and four contacts located on the same side of the absorber layer and that are connected to the lateral current conducting layer. The analog outputs from the multiple LEPSD elements are provided on a shared set of output lines but in a time-multiplexed manner, similar to the output for an imager array. Instead of providing continuous-time output signals for the LEPSD elements, time-multiplexed outputs for the multiple array elements are provided on a time-sampled, frame-by-frame basis. As a result, although the response bandwidth of each LEPSD element and its preamplifier circuits 210 can be large, the continuous, real-time output rate of this prior array can be limited to its frame-by-frame sampling of the LEPSD output currents. Thus, this array can provide information on the temporal shape of only fairly wide pulses of incident light, since the frame-by-frame multiplexed readout has a maximum rate of approximately 100 kHz. In the approach of FIG. 3, the outputs from different LEPSD channels are sampled and held and then are time multiplexed, rather than being summed, before being supplied to an analog to digital converter.

Figure 4:
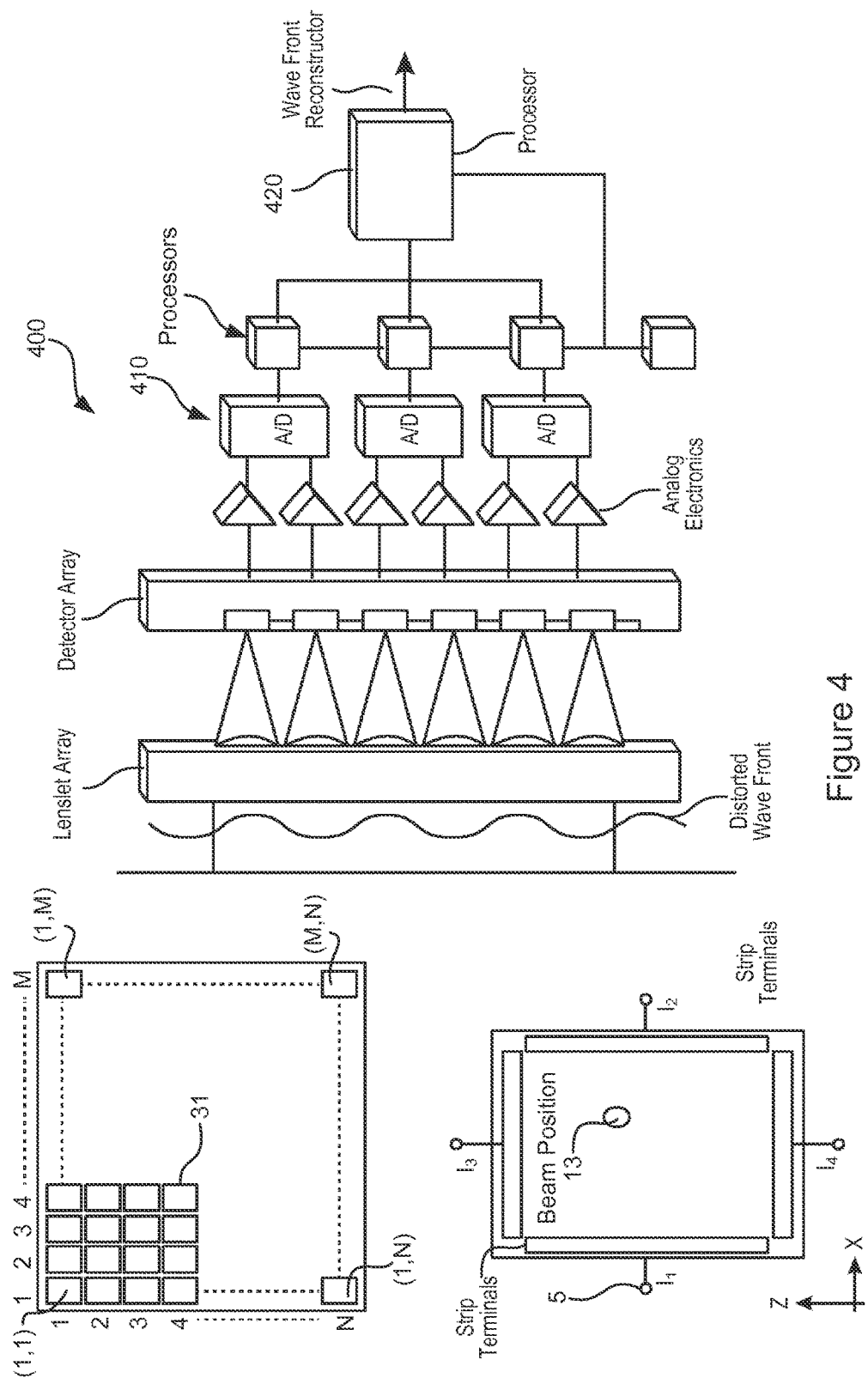
FIG. 4 is a circuit diagram including an LEPSD array with the outputs from different LEPSD elements connected to different analog to digital converters.

FIG. 4 is a circuit diagram 400 including an LEPSD array with the outputs from different LEPSD elements connected to different analog to digital converters (ADC) 410. For this array of duo-lateral PSD, or dual-axis LEPSD, elements, the illuminated-spot location signal from each different LEPSD element is connected to a different ADC 410. The digital signals from the ADCs 410 are then processed together 420. This LEPSD array can have a limitation that in order to achieve the large response bandwidth suitable for detecting and discerning short pulses or closely spaced pulses, the sampling rate of each ADC 410 must be sufficiently high. Also, for the array to have a large FOV, achieved by having many elements in the array, many separate ADC circuits may be needed, since each individual LEPSD element has its own ADC 410, with an associated cost and power consumption of those many ADCs.

Figure 5:
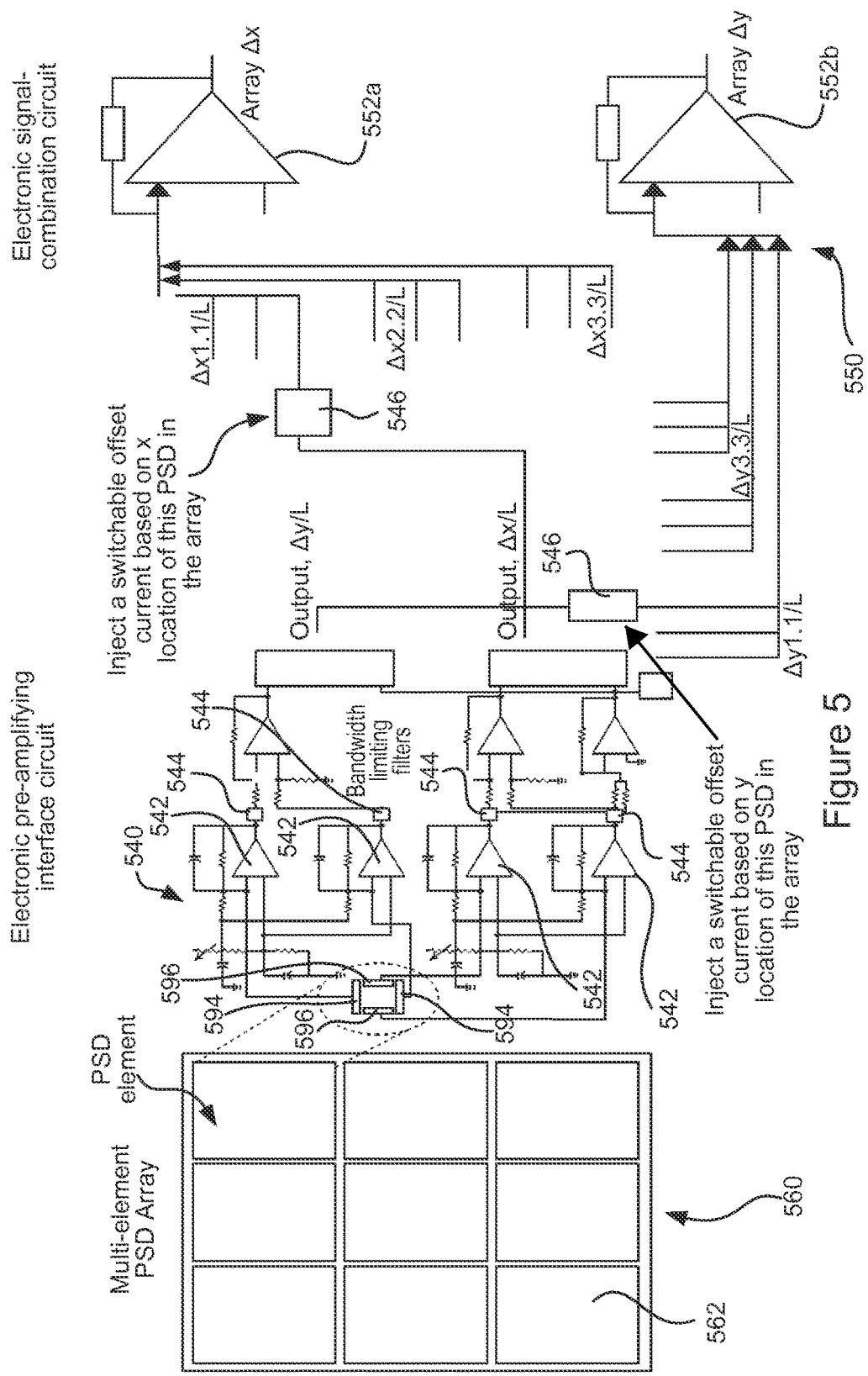
FIG. 5 is a circuit diagram of an exemplary LEPSD array for which the position-location currents for each LEPSD element are combined by a current summing amplifier.

FIG. 5 is a circuit diagram of an exemplary LEPSD array 560 for which the position-location currents for each LEPSD element 562 (e.g., LEPSD 100 described herein) are combined by a current summing amplifier. An embodiment is described in commonly assigned U.S. patent application Ser. No. 14/138,037, filed Dec. 21, 2013, and entitled "OPTICAL ANGLE OF ARRIVAL SENSORS AND METHODS FOR DETERMINING AN ANGLE OF ARRIVAL OF INCIDENT LIGHT," which is incorporated in its entirety herewith. In the position-determining interface circuit 540 the LEPSD element 562 of the array 560 is connected to four trans-impedance amplifier (TIA) circuits 542, with the four contacts 594 and 596 connected to a different TIA circuit 542. The output of each TIA circuit 542 is coupled to a filter 544 that band-limits the noise. One configuration combines the outputs from the multiple signal channels, with a signal channel associated with each array element 562. Each signal channel has two outputs. One output provides the displacement of the illuminated spot along the x-axis for its associated LEPSD element 562 and the other output provides the displacement of that illuminated spot along the y-axis. The outputs may be generated using difference and sum amplifiers as described herein. The two output signals from each LEPSD channel of the array 560 and corresponding interface electronics, which indicate the X and Y displacements of the illuminating spot from the center of that LEPSD clement 562, are coupled to a pair of circuits 546 that inject a predetermined offset current to each output signal. The offset current is indicative of the relative location of the LEPSD element 562 for that channel in the overall array 560.

A position-determining interface circuit 540 for each LEPSD element 562 also has a threshold detect circuit (not shown) that determines whether the total photo-current generated in the clement 562 exceeds a threshold value (e.g., predetermined value). The threshold detect circuit can be used to eliminate false detections of an input pulse due to noise of the LEPSD element 562 or the corresponding TIA circuits 542. The output currents or voltages from the multiple position-determining interface circuits 540, with one circuit for each LEPSD element 562 of the array 560 are summed together by an electronic signal-combination circuit 550 that includes a pair of electronic summing amplifiers 552, where one of the summing amplifiers 552*a* is associated with the X displacement and the other summing amplifier 552*b* is associated with the Y displacement.

Therefore, each LEPSD element 562 of the array 560 has four electrical outputs which are coupled to a position-determination circuit which produces a set of two currents whose values are indicative of the location, along two orthogonal axes, of a spot of light illuminating that LEPSD element of the array, with the location of the center of that element represented as a zero value for both axes. A corresponding electronic circuit 546 injects an additional amount of electrical current, e.g., an offset current, indicative of the particular location of that element in the array. The offset current for a given LEPSD element location is supplied when light of sufficiently high intensity is illuminating that LEPSD element. The outputs from the position-determination circuits of multiple LEPSD elements can remain connected at the input of the same current-summing amplifier 552*a* regardless of the presence or absence of an illuminated-spot location signal for that LEPSD element. By combining the spot-location outputs and offset currents from multiple LEPSD elements to generate a combined waveform, one ADC can be shared among multiple LEPSD elements or spot-location channels of the array. Output noise powers from the multiple combined channels are summed together at the input of the current-summing amplifier. High noise can occur because all of the channels are connected to the current-summing amplifier regardless of whether a channel has any spot-location signal current.

Figure 6:
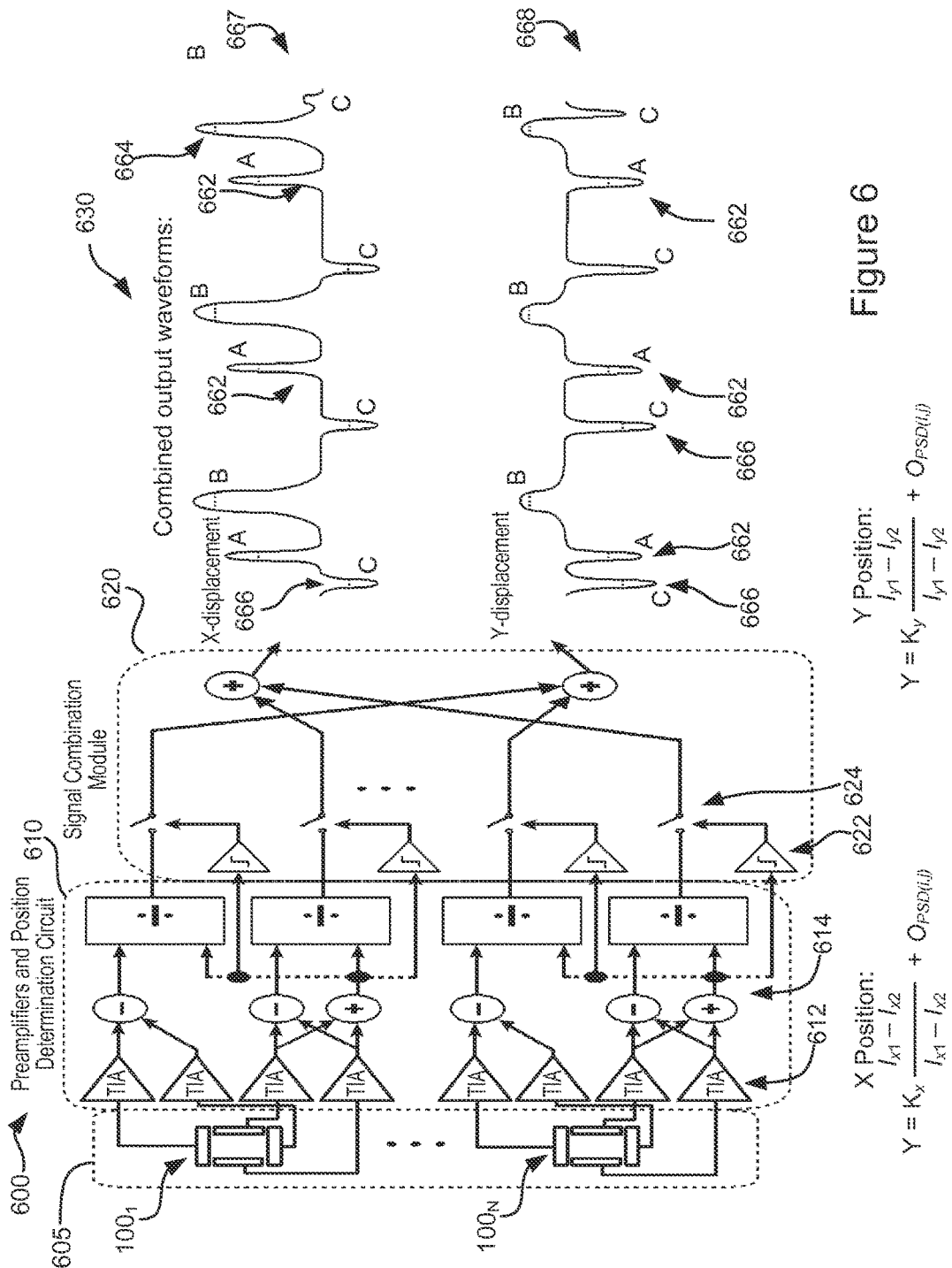
FIG. 6 is a circuit diagram of an exemplary array LEPSD (ALEPSD) with a signal combination module that includes switched outputs from the multiple array elements.

FIG. 6 is a circuit diagram of an exemplary array LEPSD (ALEPSD) 600 with a signal combination module that includes switched outputs from the multiple array elements. The ALEPSD 600 includes an array 605 of multiple LEPSD elements $100_1$-$100_N$, a set of preamplifiers and a position determination circuit 610 associated with and coupled to each LEPSD 100 element, and a signal combination module 620 for the subsets of multiple array elements. The signal combination module produces an output waveform 630 that indicates both the temporal occurrence of a pulse or flash of incident light and the spatial location of the spot of the incident light projected onto the ALEPSD 600. For example, light from one pulsed laser source is reflected from two different objects onto the aperture of the optical sensor, with one object having a broadened reflected pulse. Also, for this exemplary case, light from a second pulsed laser source, which has a different pulse repetition rate, is reflected from yet another object onto the aperture of the optical sensor. Thus, there are three different incidence angles for the pulses of light that are collected by the optical sensor, corresponding to the pulses 662 (pulse A), 664 (pulse B), and 666 (pulse C)). Because the optical sensor has sufficiently fast (and large bandwidth) response, the analog outputs of the optical sensor (as illustrated by the waveforms 667 and 668 (showing x-displacement and y-displacement waveforms) can indicate a width of a pulse and also can indicate a situation when two pulses overlap in time. The waveforms 667 and 668 are continuous waveforms (resulting from the detection of pulses of light projected onto the LEPSD elements $100_1$-$100_N$ in the array 605 of FIG. 6) instead of outputs provided on a frame by frame basis. For example, the amplitude of the signal waveforms 667 and 668 may be used to determine the location of the spot of light on the LEPSD elements $100_1$-$100_N$ in the array 605 of FIG. 6.

In FIG. 6, each LEPSD element of the array 605 has four output contacts and those contacts are connected to four TIA circuits 612. The output of each TIA circuit 612 can be coupled to a filter that band-limits the noise, e.g., as described in the commonly assigned '037 patent application. The outputs of the four TIA circuits 612 are connected to a position determination circuit (PDC) 614 that performs analog subtraction, addition and division operations to calculate the displacement of the location of a spot of incident light relative to the center of the LEPSD element. Two analog output signals are associated with each LEPSD element and are provided by the division circuitry in the PDC 614. The two output signals, which may be considered as being the spot location signals for the two orthogonal axes defined for the PSD array, are associated with the same LEPSD channel of the array. One output signal indicates the displacement of the spot location along the x-axis for its associated LEPSD. The other output signal indicates the displacement of that spot location along the y-axis. These two output signals, the illuminated-spot location signals, are supplied to the signal combination module (SCM) 620. In addition to these spot location signals, the LEPSD channels also provide to the SCM 620 the output of the addition circuit in the PDC of that channel. Therefore, the SCM 620 can provide a real-time output waveform 630 to give a real-time indication of when the light happens and the location of the light, which a frame-by-frame readout cannot provide.

The SCM 620 is coupled with multiple LEPSD channels of the array. For each LEPSD channel, the SCM 620 connects the output of the PDC 614 addition circuit to a comparator 622 that produces an output logical 1 value when the output of the PDC 614 addition circuit exceeds a threshold set-point and a logical 0 value otherwise. This digital control signal is used to control a pair of switches 624 to which the two spot location signals for that LEPSD channel are connected. The switches 624 close and pass the two spot location signals only when the control signal has a value of 1, indicating that a pulse of light illuminates the associated LEPSD element. The comparator 622 acts as a threshold detect circuit that determines whether the total photo-current generated in the LEPSD element exceeds some threshold value, e.g., about 0.5 Volts for a 0-3 Volt circuit. The SCM 620 can be used to eliminate false detections of an input light pulse due to noise of the LEPSD or its TIA circuits 612. The SCM 620 also can be used to compensate for slowly varying background light, so that only the short pulses or flashes of light coupled onto the LEPSD are considered. Although a pair of comparators 622 are shown in FIG. 6 for each LEPSD channel, it also is sufficient to have only one comparator 622 for each channel, with that comparator controlling both switches 624 of that channel.

Therefore, for each LEPSD element that has four electrical output currents arranged as two sets (other numbers of output currents can be used), with each set comprising a pair of output currents output from electrodes located at opposite ends of the LEPSD element. These two output currents are converted to voltage signals, through the TIA amplifiers 612. In the PDC 614 for that LEPSD element, the outputs from the two TIA amplifiers 612 of a pair are combined in a summing amplifier to provide a net summed signal that corresponds to the intensity of the spot of light illuminating the LEPSD element. The net summed signal is used to control the switches 624 associated with that LEPSD element, such that the switches 624 connects the PDC 614 output to the combiner circuit or module only when the net summed signal is greater than a threshold set point. In some implementations, the net summed signal also controls whether and when an offset value, e.g., discussed in FIG. 8, is added to the PDC output value.

The array LEPSD (ALEPSD) has an overall area for light detection and light-spot position determination that is large, to enable an angle of arrival sensor containing that array detector to have large angular field of view (FOV). Because the ALEPSD is comprised of multiple LEPSD elements each of which has a relatively small area, the same angle of arrival sensor can have fast response and lower noise. The fast, wide-frequency-bandwidth response enables the sensor to distinguish the temporal width of pulses of incident light and to distinguish between two pulses closely spaced in time. The low noise response enables the sensor to sense weaker pulses of incident light. The SCM 620 produces a pair of outputs that indicate the location (along two orthogonal axes) of a spot of light (or multiple spots of light) illuminating the larger overall area of the LEPSD array or a subset of that array. Thus, although the LEPSD element has small area and its PDC 614 has low noise, the SCM 620 enables the ALEPSD to have a much larger area and still have the low noise and fast response associated with a single LEPSD element The SCM 620 can have lower noise than un-switched, current-summing approaches for combining the signals from multiple LEPSD elements of an array. This allows more array elements to be combined together to achieve a larger effective area for position sensing. Also, because a subset of more array elements can have their outputs combined before being coupled to the same analog to digital converter, fewer analog to digital converters are needed for a large FOV sensor.

The large FOV achievable with an array LEPSD enables the angle of arrival sensor to be mounted in a body-fixed configuration in a vehicle rather than needing to be mounted in a bulky mechanical gimbal that then points the sensor in various desired directions. This sensor can be used for guiding a steerable projectile, and typically is located at the nose or tip of that projectile. This sensor can have a smaller diameter and make more efficient use of the available area at the nose of the projectile for an aperture that captures the laser light whose incidence angle relative to the position of that projectile is to be determined. Prior approaches for angle of arrival sensors typically have a silicon 4-quadrant detector. The size of each quadrant is large (>>1 mm size) and this large size limits the response speed (or frequency bandwidth) of the sensor and increases its noise. Alternatively, a smaller-area 4-quadrant detector has smaller FOV. The sensor can fit within the pointed-nose shape of many projectiles (whose diameter at the tip of its nose can be smaller than an inch) and within the small-diameter (<4 inch diameter) shape of other projectiles. Furthermore, unlike sensors with silicon detectors, the array LEPSD sensor can be fabricated with detectors made from direct-bandgap materials that detect light of eye-safe wavelengths (>1.4 µm) emitted by future laser designators as well as the 1.06 µm wavelength emitted by most current laser designators. The small-diameter and compact size made possible by the array LEPSD and the SCM 620 can make it suitable for many guided munitions.

Figure 7:
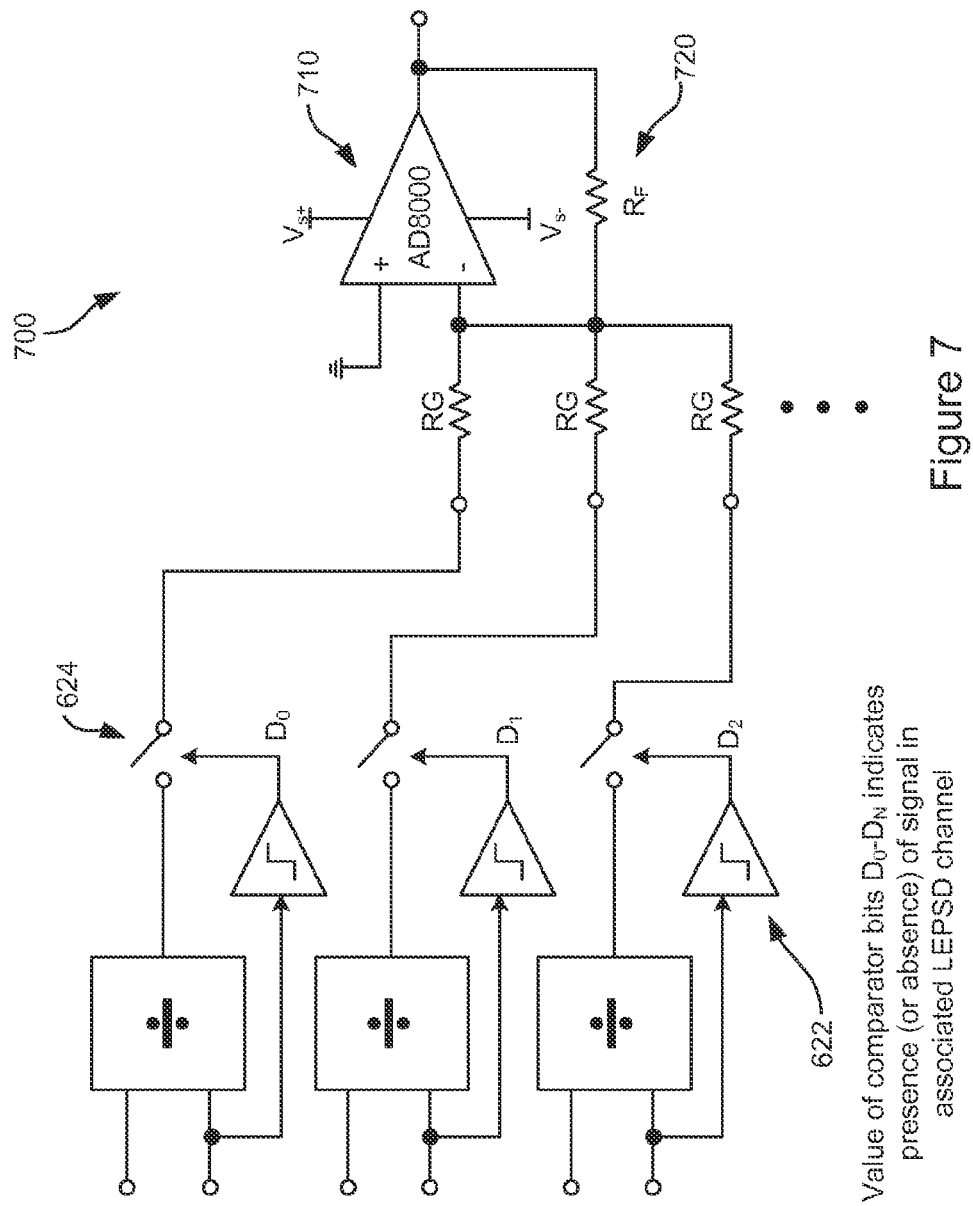
FIG. 7 is a circuit diagram of an exemplary voltage summing circuit to combine outputs from multiple LESPD array elements.

FIG. 7 is a circuit diagram of an exemplary voltage summing circuit 700 to combine outputs from multiple LESPD array elements. In some implementations, the output of the analog divider circuit in the PDC 614 of a LEPSD channel is a voltage waveform. That voltage waveform is connected to a summing amplifier 710 in the SCM 620 when the digital control signal for that LEPSD channel has a logical 1 value. Otherwise, that LEPSD channel is not connected to the summing amplifier 710, and the noise from that channel is not added to the noise of the summing amplifier. Multiple LEPSD channels can be connected, or not connected, to the summing amplifier 710 in this manner, as illustrated in FIG. 7. In some embodiments the channels for all of the LEPSD elements of the array are connected to the same summing amplifier 710. In other embodiments, the channels for a subset of the LEPSD elements of the array are connected to the same summing amplifier 710, and there can be multiple summing amplifiers 710 in the SCM 620. For each subset of combined LEPSD elements, there can be a summing amplifier 710 associated with the X displacements and another summing amplifier 710 associated with the Y displacements. These summing amplifiers 710, and also a signal processing module in some embodiments, produce a pair of outputs for the LEPSD array subset that are similar to the outputs a single large-area LEPSD have that includes those LEPSD elements of that subset.

One constraint on the number of LEPSD channels that can be coupled to the same voltage summing amplifier 710 is the desired frequency response bandwidth. Each of the switches 624 connected to the input of the voltage summing amplifier 710 has an associated capacitance, with the capacitances for the multiple switches 624 combined in parallel. The coupling resistances of the multiple inputs to the summing amplifier 710 is sufficiently small to enable the RC-limited frequency response of the summing amplifier 710 to be larger than the required frequency response bandwidth of the sensor. Also, the feedback resistance 720, which is connected to a virtual ground at the input of the op amp, is sufficiently large to comply with the current driving capability of the summing amplifier 710 but sufficiently small to comply with the voltage output capability of that summing amplifier 710.

When the incident light is a pulse, the X-displacement or Y-displacement output waveform produced by the SCM 620 has a pulse whose amplitude (which can be positive or negative) is indicative of the angle of arrival of the pulse of light that is collected by the aperture of the sensor and is then focused and projected by a lens of the sensor as a spot illuminating the LEPSD array. For some embodiments, the output of the SCM 620 is a time-varying waveform, as illustrated at the right of FIG. 6. This output waveform is constructed from a combination of the illuminated-spot location waveform and a set of offset pulses. The amplitudes of those offset pulses indicate the relative location in the array of the specific LEPSD element that supplies the spot location waveform.

If there are several pulses of light that are incident from different directions onto the aperture, the X-displacement and Y-displacement output waveforms of the SCM 620 can include pulses whose amplitudes are different, corresponding to those different angular directions of the pulses of incident light. The waveforms depicted in FIG. 6 illustrate an exemplary case in which light from one pulsed laser source is reflected from two different objects (A and B) onto the aperture of the angle of arrival sensor, with one object (B) having a broadened reflected pulse, and light from a second pulsed laser source (which has a different pulse repetition rate) is reflected from yet another object (C) onto the aperture of the angle of arrival sensor. There are three different incidence angles for the pulses of light that are collected by the angle of arrival sensor and three different spots of light are projected onto the ALEPSD. Because the sensor has sufficiently fast (and large bandwidth) response, the two output waveforms of the SCM 620 can indicate the width and time of occurrence of the pulse and also can indicate a situation when two pulses overlap in time.

FIG. 8 shows several illustrative examples of how the LEPSD identifying offset value is determined. For each LEPSD element, the output from the PDC 614 of that element has a value which can vary between $-G_{PSD}$ and $+G_{PSD}$. The total variation in that position location value along one axis is $2 \cdot G_{PSD}$. For an array subset of N elements on a side, with N being an odd number, the element at the center of that array subset will have an offset value of 0. The element at the left end of that subset will have an offset value of $-G_{PSD}(N-1)$. The next element from the left end will have an offset value of $-G_{PSD}(N-3)$, and so on. The element at the right end of that subset will have an offset value of $+G_{PSD}(N-1)$. The next element from the right end will have an offset value of $+G_{PSD}(N-3)$, and so on.

Figure 9:
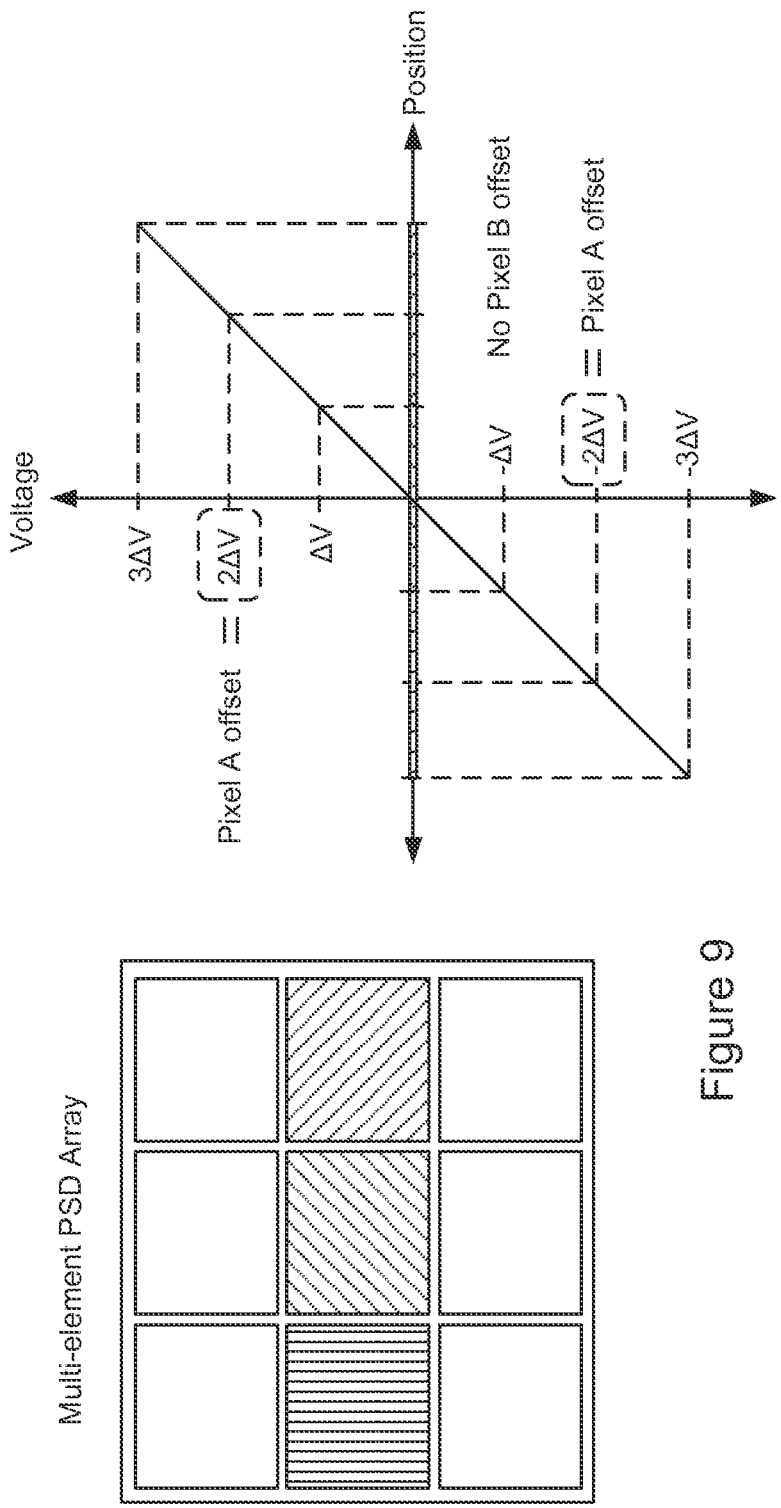
FIG. 9 illustrates an example of how the offset voltages relate to the illuminated-spot location voltages produced by the position determining circuit (PDC) of a LEPSD channel.

FIG. 9 illustrates an example of how the offset voltages relate to the illuminated-spot location voltages produced by the PDC 614 of a LEPSD channel. The spot location voltage has a swing of $\pm \Delta V$, the center of the LEPSD element immediately to the right of the central element of that subset should be offset by a voltage of $+2\Delta V$. For that LEPSD element, the spot location values range between $\Delta V$ and $3\Delta V$. Similarly, the center of the LEPSD element immediately to the left of the central element of that subset should be offset by a voltage of $-2\Delta V$. Thus, for that LEPSD element, the spot location values range between $-3\Delta V$ and $-\Delta V$.

A maximum number of LEPSD elements 100 that can be combined with these voltage offsets is constrained by the voltage supply limitation of the summing amplifier. As an example, the photocurrent from the incident spot of light and the noise of a LEPSD element have levels that enable the determination of seven distinct locations for the spot of light within the width of the LEPSD element. For an output noise voltage of 60 $mV_{pp}$, the noise limited swing for the spot location signal of an LEPSD element is ±420 mV. Thus, the voltage offset increment is 840 mV. The voltage summing amplifier for a subset of 5×5 array elements requires a supply voltage of at least ±2.1 V. Also a voltage summing amplifier driven by a ±5V power supply can support up to an 11×11 element subset of the array. The calculations assume only one spot of light illuminates a subset at any given instance of time.

Figure 10:
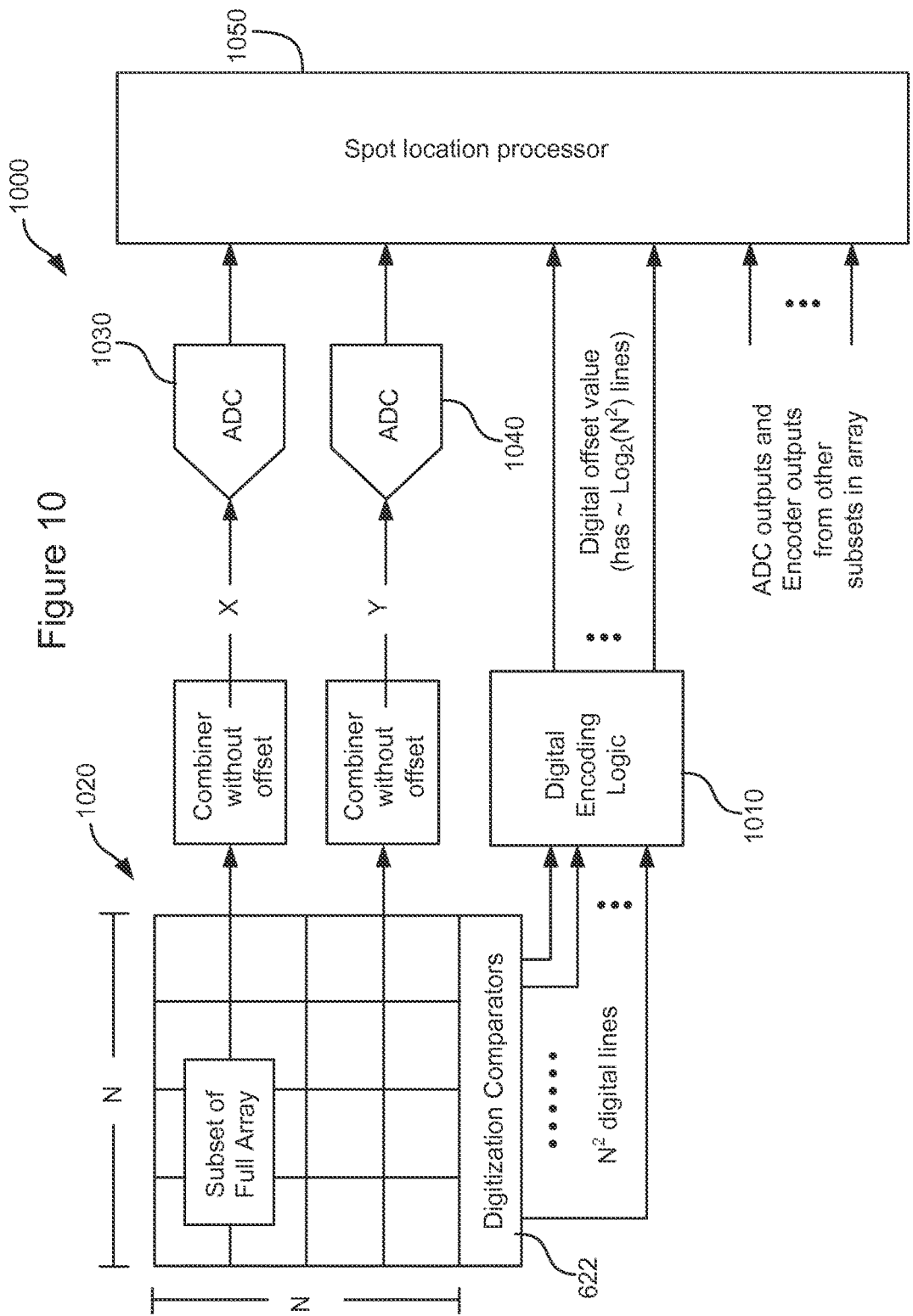
FIG. 10 is a circuit diagram of an exemplary circuit for determining offset pulses.

FIG. 10 is a circuit diagram of an exemplary circuit 1000 for determining offset pulses. There are several ways to determine and provide the offset pulses which identify the specific LEPSD elements that are illuminated by the spots of light to be located. In one embodiment, the values of the offsets are determined by a digital encoding logic circuit 1010. The digital encoding logic circuit 1010 receives as its inputs the digital control signals, e.g., digitized comparator 622 output values, from the multiple LEPSD channels of the array subset 1020. The digital encoding logic circuit 1010 then produces a pair of binary numbers that are indicative of the location along two orthogonal axes of the LEPSD channel whose digital control signal has a logical 1 value.

In FIG. 10, the voltage combined or summed outputs for that subset of LEPSD channels is coupled to an analog to digital converter (ADC), with one ADC 1030 for the X-displacement outputs and another ADC 1040 for the Y-displacement outputs. The voltage combined outputs can be produced by voltage summing amplifiers such as the one illustrated in FIG. 7. In FIG. 10, each subset of LEPSD channels have its own set of two ADCs and its own digital encoding logic circuit for determining the offset value for the pulse of light detected by that subset of channels. A spot location processor 1050 then combines the ADC outputs and the outputs of the digital encoding logic circuit 1010 for each subset to produce the desired digital waveform whose pulse amplitude represents the location of the spot of light illuminating that subset of LEPSD elements. Different subsets of LEPSD elements can be illuminated simultaneously by different spots of light. This spot location processor can provide the locations of those multiple simultaneous spots of light that may illuminate the ALEPSD.

Figure 11:
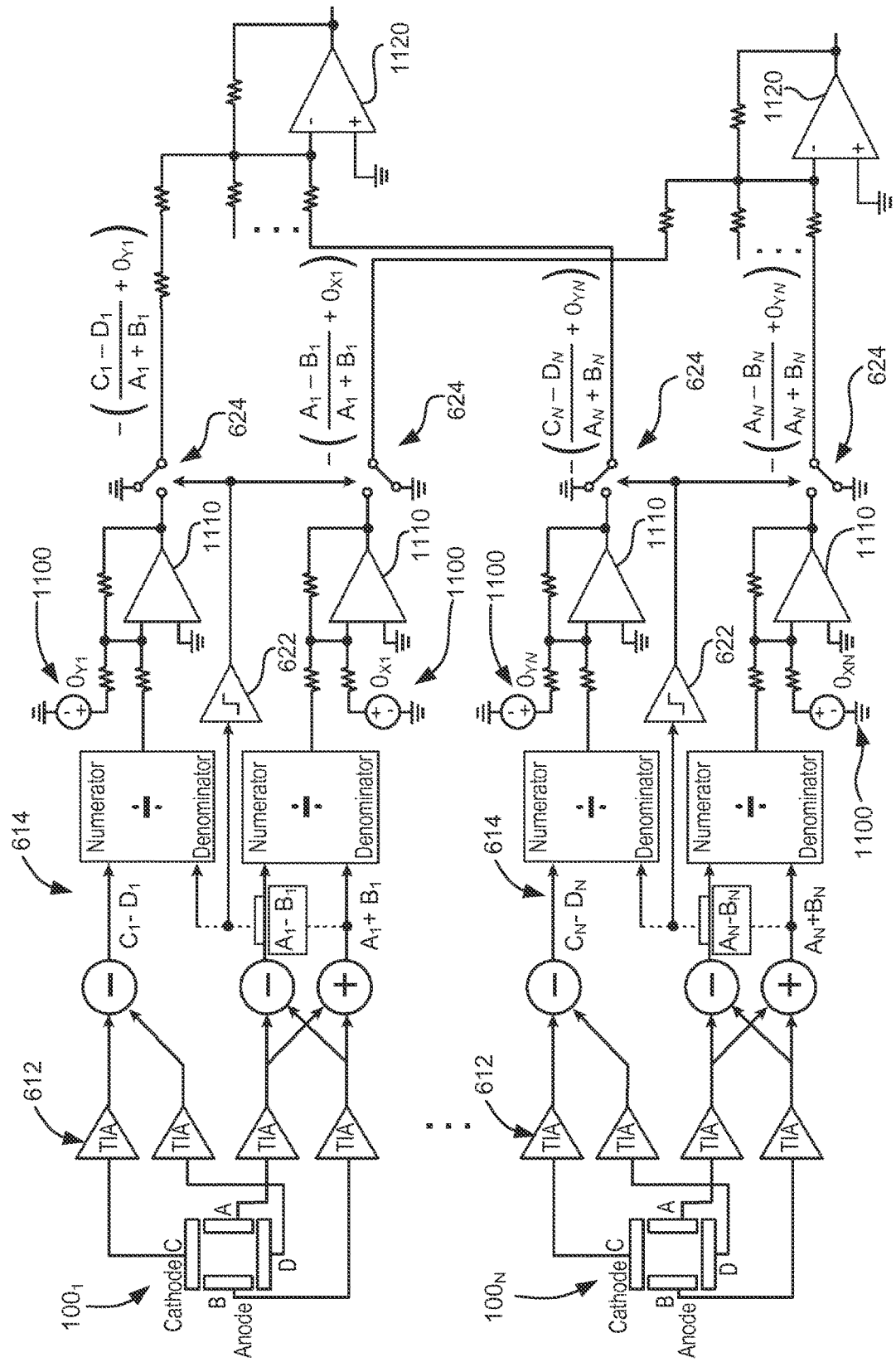
FIG. 11 is a circuit diagram of an exemplary LESPD element with offset provided as an offset voltage.

FIG. 11 is a circuit diagram that explicitly shows two exemplary LEPSD elements $100_1$ and $100_N$ of an array 605 that has N elements, or of an N-element subset of array 605. Each LEPSD element (e.g., $100_1$) has a pair of LEPSD-element identifying offset generators 1100 that provide offset voltages (e.g., $O_{Y1}$, $O_{X1}$) that indicate the relative location of that particular LEPSD element (e.g., $100_1$) in the array or array subset. The LEPSD-element identifying offsets can be provided as voltage levels $O_{Y1}$. $O_{X1}$ that are added to the spot-position location pulses produced by the PDC 614 of that LEPSD channel and coupled through the switches 624 in the SCM 620 to the voltage summing amplifiers 1110. The element-identifying offset in the Y direction $O_{Y1}$ for LEPSD element $100_1$ is added to the Y-displacement output waveform from PDC 614 and the element-identifying offset in the X direction $O_{X1}$ for that same LEPSD element is added to the X-displacement output waveform from PDC 614. An amplifier stage 1110 adds a continuous offset voltage $O_{Y1}$ or $O_{X1}$ to the corresponding pulsed waveform produced from PDC 614. The position location pulses in that waveform are coupled through the switches 624 only when the control signal for that LEPSD channel (e.g., for LEPSD element $100_1$) has a logical 1 value. Since the switches 624 for a LEPSD channel are closed only when the X-displacement and Y-displacement output waveforms for that LEPSD channel have a pulse, the resulting waveforms output from the switches 624 are pulses that have additional voltage values (e.g., $O_{Y1}$, $O_{X1}$) added to them. The offset-added output waveforms from the SCM 620 circuitry for different LEPSD elements $100_1, \ldots, 100_N$ can be combined by amplifiers 1120.

Figure 12:
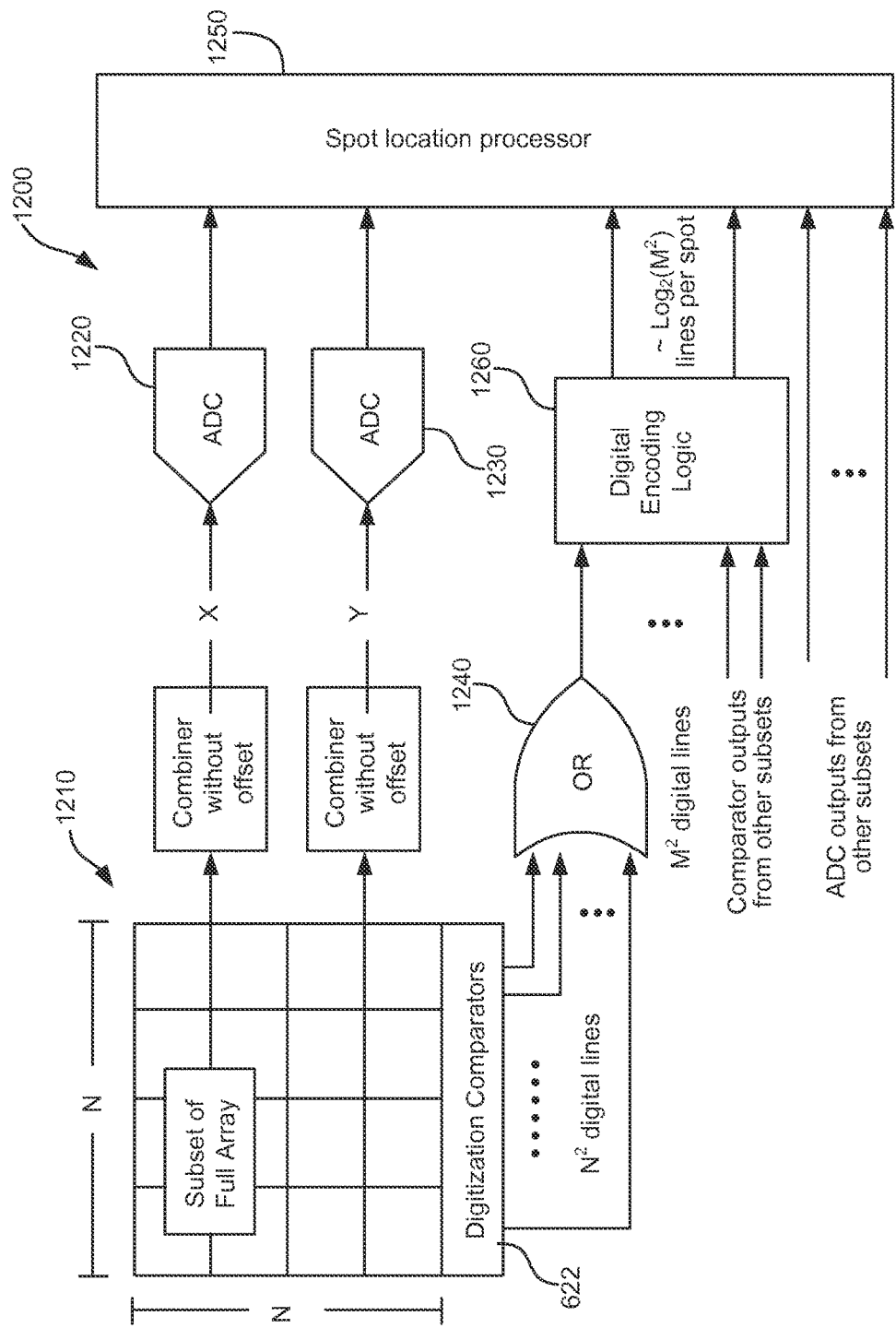
FIG. 12 is a circuit diagram of an exemplary circuit for determining offset pulses.

FIG. 12 is a circuit diagram of an exemplary circuit 1200 for determining offset pulses in an array comprising M subsets 1210 that each contain N LEPSD channels. The output of the voltage summing amplifier (e.g., summing circuit 700 in FIG. 7) for the subset array 1210 can be coupled to an ADC 1220 for X-displacement outputs for that subset 1210 and an ADC 1230 for Y-displacement outputs for that subset 1210, e.g., two spot location waveforms with one waveform for the displacement along each orthogonal axis. The digital control signals for the various LEPSD channels in that subset are combined by a logical OR circuit 1240 to produce a net indicator flag for that subset. This indicator flag has a logical 1 value when a spot of light is incident on any LEPSD element of that array subset. The ADC outputs and the indicator flag for each subset of the array are supplied to a spot location processor 1250 along with the outputs of the digital encoding logic 1260. The spot location processor 1250 can determine the locations of multiple spots of light that illuminate the ALEPSD, with one spot at a time allowed in any given array subset.

If two spots of light illuminate the same array subset, the voltage summing amplifier generates a summed output value that does not correspond to the location of either illuminating spot. The summed output voltage can reach the saturated output value for the amplifier. In some cases, it is desirable to have the array subset act like a single large LEPSD that has the size of the array subset. If such a large LEPSD were illuminated simultaneously by two spots, the resulting output indicates a location that is half way between those two spots. This occurs due to the photocurrents from both illuminating spots reaching the electrical contacts of the LEPSD. An approach is described in FIGS. 13 and 14 for achieving a half-way or median location when multiple simultaneous spots of light illuminate different LEPSD elements of an array subset.

Figure 13:
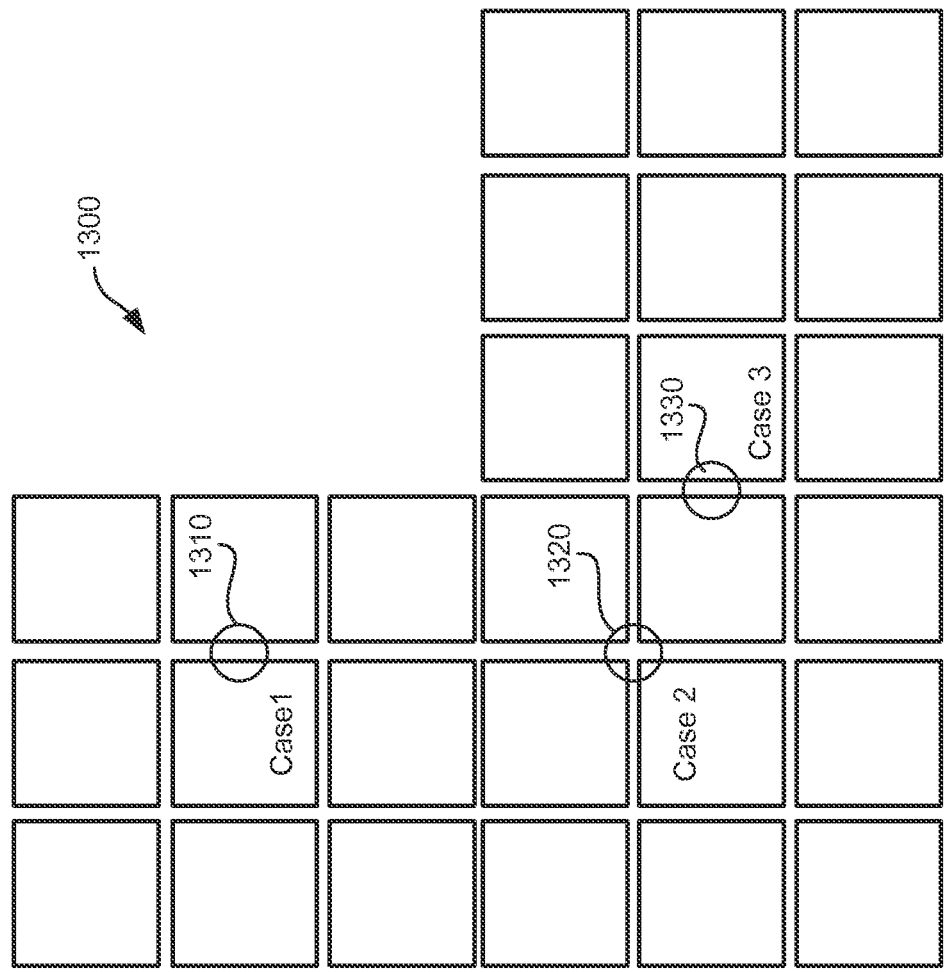
FIG. 13 illustrates several exemplary cases in which a spot of light straddles several adjacent LEPSD elements.

FIG. 13 illustrates several exemplary cases in which a spot of light straddles several adjacent LEPSD elements 1300. In Case 1 (1310), the spot straddles two adjacent LEPSD elements of the same subset. Two digital control signals of the SCM 620 have a logical 1 value. The voltage summing amplifier adds the net position location voltage (including offset) that indicates a spot is located at the left edge of one LEPSD element and the net position location voltage (again including offset) that indicates a spot is located at the right edge of the adjacent LEPSD element. By having the spot location processor 1250 sum the illuminated-spot location voltages of these two spots and then divide the summed voltages by two, the output signal from the SCM 620 indicate that there is a spot located at the junction between those two LEPSD elements, as desired.

In Case 2 (1320), the spot straddles four adjacent LEPSD elements of a subset. In this case, four digital control signals of the SCM 620 have a logical 1 value. Also four LEPSD channels produce voltage outputs (including offsets) that are connected to the voltage summing amplifier through their switches. The sum of those voltage outputs is divided by four at the voltage summing amplifier. As a result, the output signal from the SCM 620 indicate that there is a spot located at the junction of those four LEPSD elements, again as desired.

For both Case 1 (1310) and Case 2 (1320), the spot is located entirely within the same array subset. However, for Case 3 (1330), the spot straddles two LEPSD elements that are part of different array subsets. In this case, those two LEPSD channels are coupled to different summing amplifiers. Thus, for this case, the spot location processor for the entire array becomes involved and interpret that single spot as two adjacent spots. In most applications, such as when the ALEPSD is used to steer or point a vehicle or a receiver, this misinterpretation is not detrimental.

Figure 14:
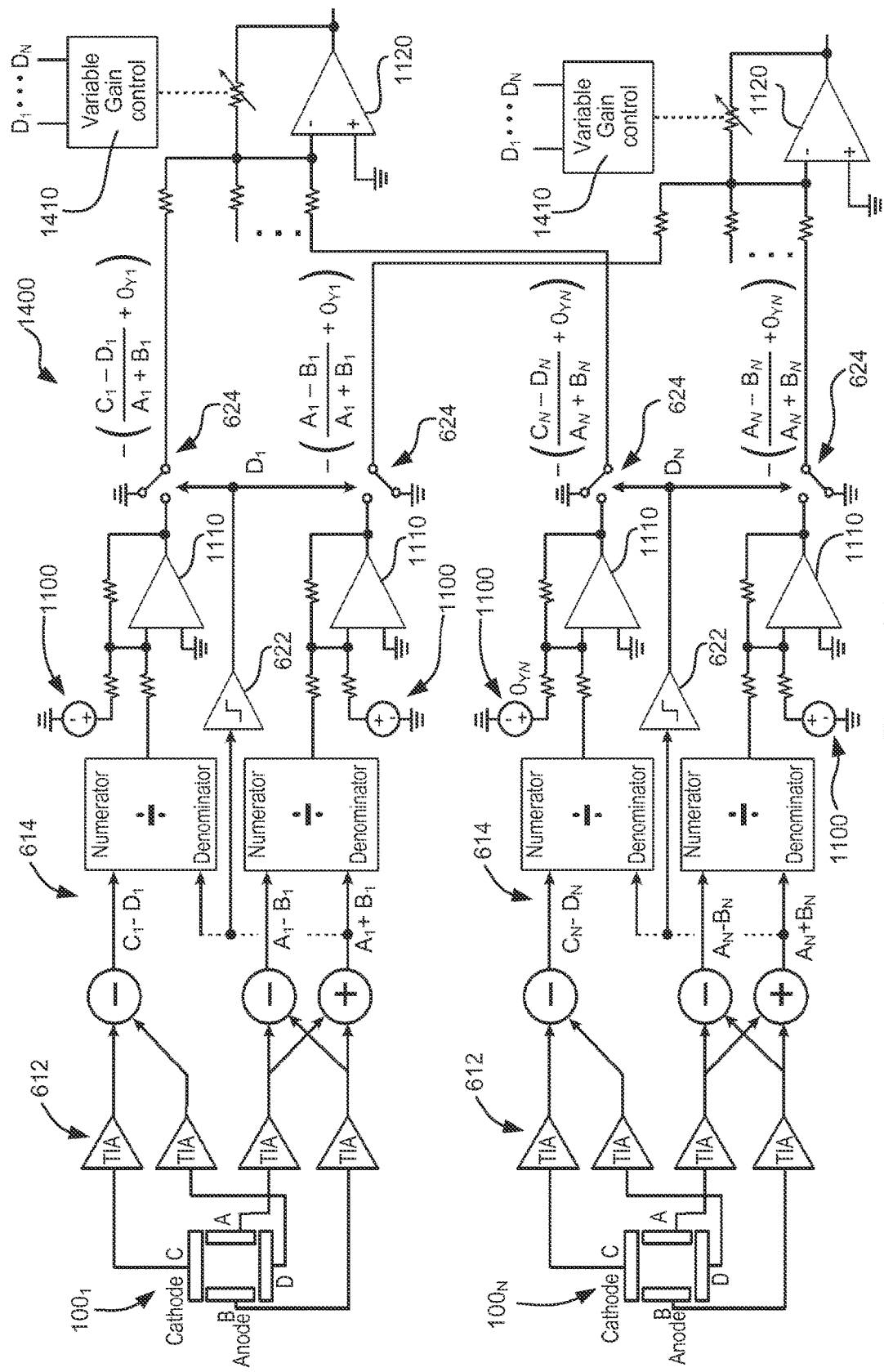
FIG. 14 is an exemplary circuit diagram including a voltage summing amplifier that has variable gain control adjusted according to the values of the control signals for the LEPSD channels associated with that amplifier.

FIG. 14 is an exemplary circuit diagram 1400 including a voltage summing amplifier that has variable gain control 1410 adjusted according to the values of the control signals for the LEPSD channels associated with that amplifier. In some embodiments, the summing amplifier 1120 of the SCM 620 can have variable gain. The gain of the summing amplifier 1120 is controlled by the values of the various digital control signals $D_1, \ldots D_N$ for the LEPSD channels $100_1, \ldots 100_N$ (e.g., the array subset) associated with the summing amplifier 1120. If only one of these digital control signals has a logical 1 value, the summing amplifier 1120 has its maximum gain, which is determined by the value of its feedback resistance. If two of these digital control signals have a logical 1 value, the gain is reduced to one half its maximum. If three of these digital control signals have a logical 1 value, the gain is reduced to one third its maximum. And, if four of these digital control signals have a logical 1 value, the gain is reduced to one fourth its maximum. Multiple LEPSD channels can indicate that their LEPSD element has produced photocurrent if there are multiple distinct spots of light that illuminate those LEPSD elements or if a single spot of light overlaps several adjacent LEPSD elements.

Figure 15:
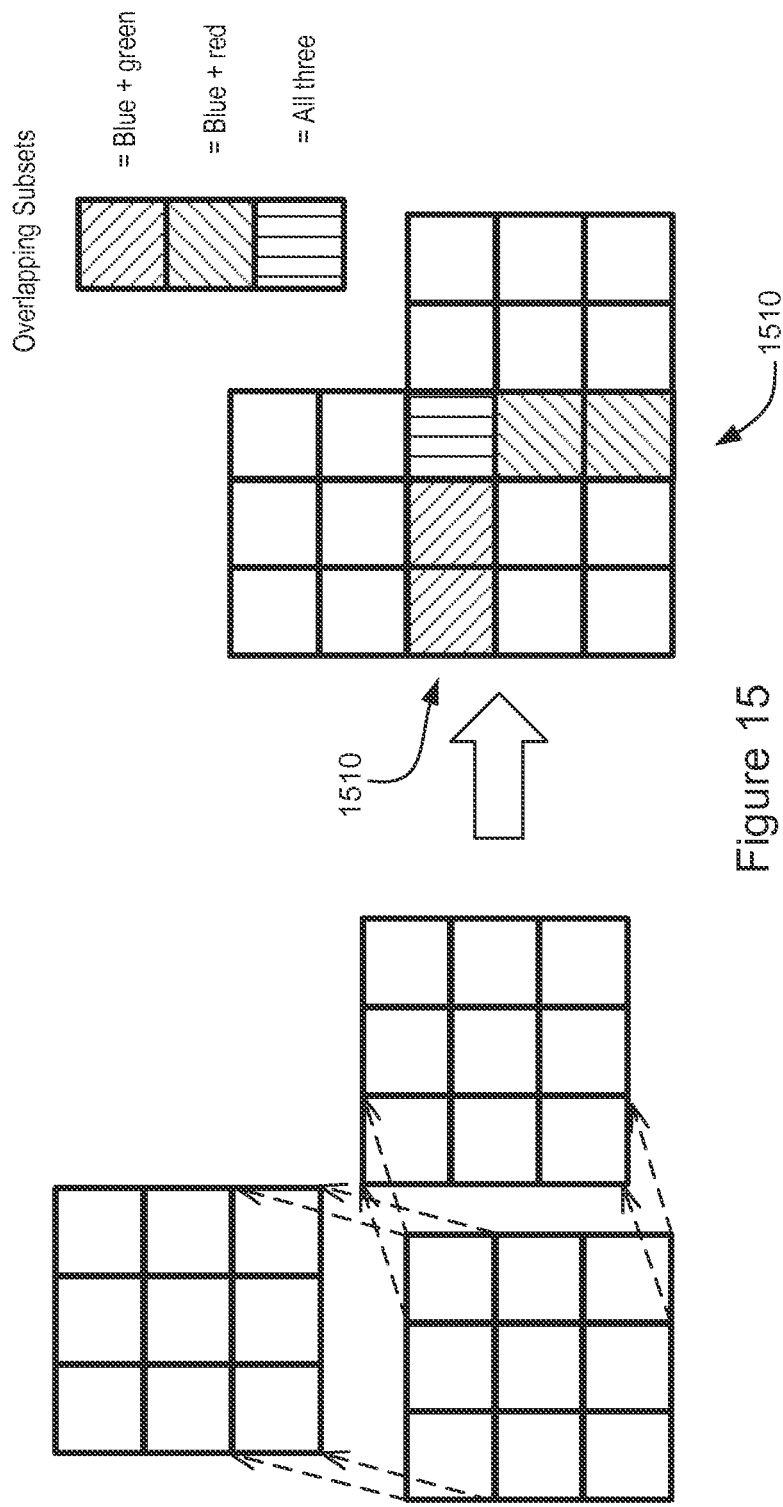
FIG. 15 illustrates an example in which different adjacent subsets have some overlapping LEPSD elements.

FIG. 15 illustrates an example in which different adjacent subsets have some overlapping LEPSD elements 1510. An illuminating spot that straddles two adjacent LEPSD elements can be interpreted as a single spot, regardless of the division of the array elements among subsets. With such an overlapping arrangement, the end row (or column) of one subset and the end row (or column) of an adjacent subset includes the same row (or column) of LEPSD elements. Such an arrangement may couple a given LEPSD channel to more than one summing amplifier.

Figure 16:
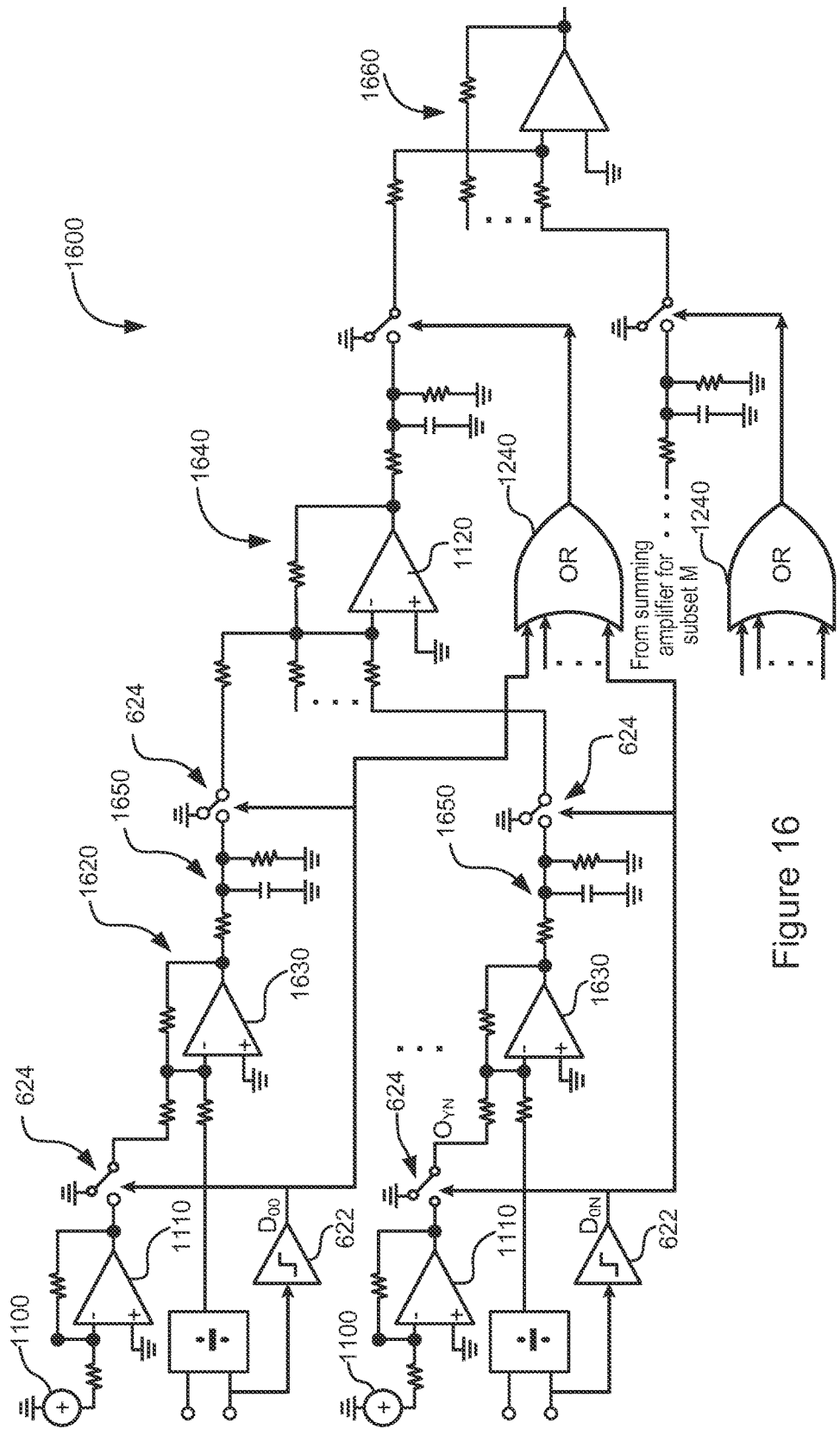
FIG. 16 is a circuit diagram of an exemplary circuit for cascading of multiple stages of summing amplifiers.

FIG. 16 is a circuit diagram of an exemplary circuit 1600 for cascading of multiple stages of summing amplifiers. The first summing stage 1620 combines the spot-location signal of one LEPSD channel with an offset signal pulse for that channel, formed by switching a DC offset level. The second summing stage 1640 includes amplifier 1120 to combine the appropriately offset, spot-location waveforms of multiple channels of an array subset. The third summing stage 1660 combines the previously combined outputs of multiple subsets. The inputs to the various summing stages switched by switches 624 according to digital control signals (e.g., $D_{00}, \ldots, D_{0N}$) also can be attenuated passively and have their noise reduced by noise-bandwidth reduction filters 1650. The multi-stage, cascaded arrangement can be used to address the response bandwidth, noise accumulation and voltage swing constraints of an ALEPSD.

The systems, methods and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:

1. A system, comprises:
an array position sensing detector, the array position sensing detector including a lateral effect position sensing detector element, a summing amplifier, and a threshold detecting circuit,
where the lateral effect position sensing detector element produces an output coupled with the summing amplifier through a switch, and
where the threshold detecting circuit is configured to operate the switch to selectively connect the lateral effect position sensing detector element to the summing amplifier based on comparing a photocurrent generated in the lateral effect position sensing detector element to a threshold set-point value.

2. The system of claim 1, where the lateral effect position sensing detector element is coupled with an electronic circuitry, the electronic circuitry configured to determine a location of a spot of light illuminating the lateral effect position sensing detector element.

3. The system of claim 1, where the lateral effect position sensing detector element is coupled with a voltage offset generator, the voltage offset generator configured to produce an offset voltage identifying the lateral effect position sensing detector element.

4. The system of claim 3, where the offset voltage is indicative of a relative location of the lateral effect position sensing detector element within an array of multiple lateral effect position sensing detector elements.

5. The system of claim 1, where the threshold detecting circuit is configured to determine whether the photocurrent generated in the lateral effect position sensing detector element exceeds the threshold set-point value.

6. The system of claim 5, where outputs of two threshold detecting circuits, one for each of two lateral effect position sensing detector elements, are coupled to a circuit that determines an offset value indicating a relative location of at least one of the two lateral effect position sensing detector elements.

7. The system of claim 6, further comprising a logical OR element, the logical OR element coupled with the outputs of the two threshold detecting circuits and is configured to control a state of the switch that is coupled to the summing amplifier.

8. The system of claim 6, where the offset value is coupled to the summing amplifier as controlled by an output of the threshold detecting circuit.

9. The system of claim 5, where the summing amplifier includes a gain that is controlled by an output of the threshold detecting circuit.

10. The system of claim 9, where the summing amplifier produces an output that is coupled to an analog to digital converter.

11. The system of claim 9, where the output of the summing amplifier is coupled to a noise-bandwidth reduction filter.

12. A method, comprising:
locating a position of a spot of light illuminating an area, the area being divided into multiple smaller regions;
sensing by lateral effect position sensing detectors the multiple smaller regions;
selecting outputs from the lateral effect position sensing detectors with a set of switches connected with the lateral effect position sensing detectors, wherein threshold detecting circuits are configured to operate the set of switches to selectively connect the lateral effect position sensing detectors to a summing amplifier based on comparing a respective photocurrent generated in each of the lateral effect position sensing detectors to a threshold set-point value; and
combining the selected outputs using the summing amplifier.

13. The method of claim 12, further comprising using a control signal provided by the threshold detecting circuits to determine an offset value indicating a relative location of the lateral effect position sensing detectors illuminated by the spot of light.

14. The method of claim 12, further comprising using a control signal provided by the threshold detecting circuits to establish a gain of the summing amplifier.

15. The method of claim 12, where the summing amplifier comprises a voltage summing amplifier, and wherein combining the selected outputs includes coupling the selected outputs to an input of the voltage summing amplifier.

16. A method, comprising:
sensing by a lateral effect position sensing detector a spot of light illuminating an area;
outputting a photocurrent from the lateral effect position sensing detector to a summing amplifier through a switch connected with the lateral effect position sensing detector; and
operating the switch to selectively connect the lateral effect position sensing detector to the summing amplifier based on comparing the photocurrent to a threshold set-point value.

17. The method of claim 16, further comprising using the photocurrent generated by the spot of light on the area with the threshold set-point value to produce a control signal, the control signal selecting a state of the switch.

18. The method of claim 17, further comprising using the control signal to switch an offset voltage indicating a relative location of the lateral effect position sensing detector illuminated by the spot of light.

* * * * *